United States Patent [19]

Lasko

[11] Patent Number: 4,541,656

[45] Date of Patent: Sep. 17, 1985

[54] CAST METAL OUTLET FITTING

[76] Inventor: John A. Lasko, 52 Notch Hill Rd., North Branford, Conn. 06471

[21] Appl. No.: 407,692

[22] Filed: Aug. 12, 1982

[51] Int. Cl.[4] ............................................. F16L 13/02
[52] U.S. Cl. ..................................... 285/286; 285/22; 285/39; 285/93; 285/189
[58] Field of Search ...................... 285/21, 22, 39, 189, 285/286, 93, 156

[56] References Cited

U.S. PATENT DOCUMENTS

| | | | |
|---|---|---|---|
| 1,823,549 | 9/1931 | Kendall | 285/156 X |
| 1,936,805 | 11/1933 | Taylor | 285/286 X |
| 1,966,403 | 7/1934 | Durham | 285/286 X |
| 2,463,006 | 3/1949 | Vander Clute | 285/286 X |
| 2,954,604 | 10/1960 | Ramey | 285/156 X |
| 3,516,692 | 6/1970 | Albrecht | 285/286 X |

OTHER PUBLICATIONS

"How to Weld Pipe", brochure, 1943, The Linde Air Products Co.

Primary Examiner—Richard J. Scanlan, Jr.
Attorney, Agent, or Firm—H. Gibner Lehman; K. Gibner Lehman

[57] ABSTRACT

A metal outlet fitting intended to be welded over a side opening in a distribution pipe for water or other fluids, is constituted as a metal casting having parting lines adapted to serve the purpose of centering the fitting prior to its attachment. The fitting has a simple tubular configuration open at both ends and preferably provided with exterior lugs to accommodate a spanner wrench as a reinforcement during attachment of piping to it. One end of the fitting has a scalloped shape to fit the side wall of the distribution pipe, and the other end portion can be either internally or externally threaded, or bored to receive a branch pipe. During the welding, the normal parting lines on the exterior can be used as locators or centralizers for matching with cross lines that are scored in the distribution pipe initially to locate the pilot of the hole saw that cuts into the pipe side wall. The method of the invention includes the step of casting the fitting, with the parting lines oriented for alignment with the cross lines, either with or without additional locator lines on the fitting.

11 Claims, 12 Drawing Figures

U.S. Patent  Sep. 17, 1985  4,541,656
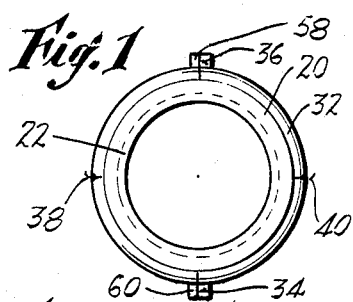
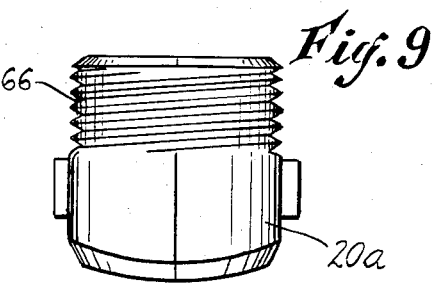
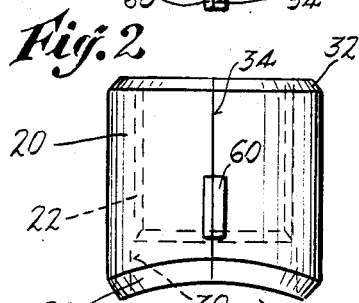
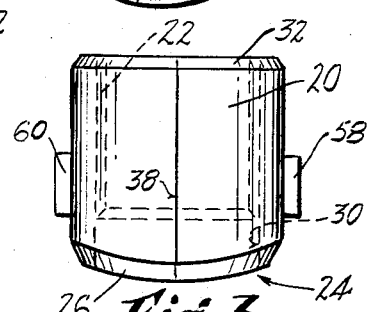
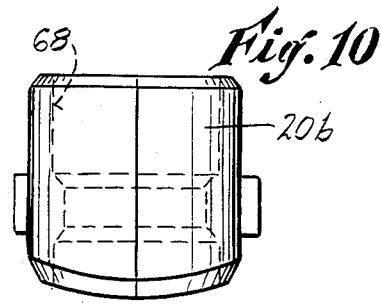
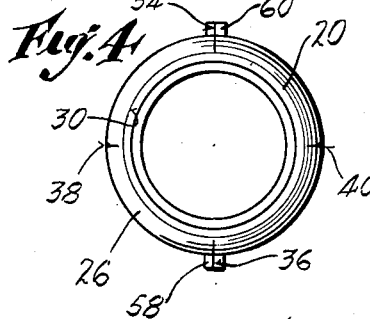
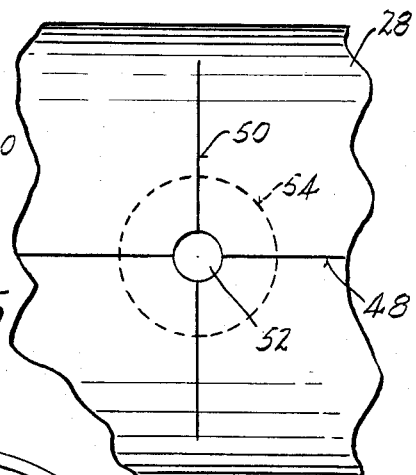
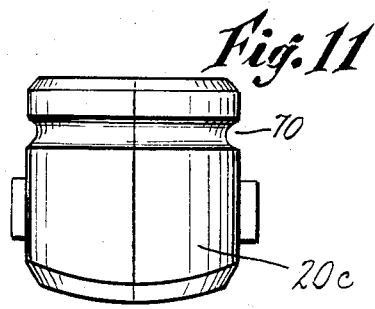
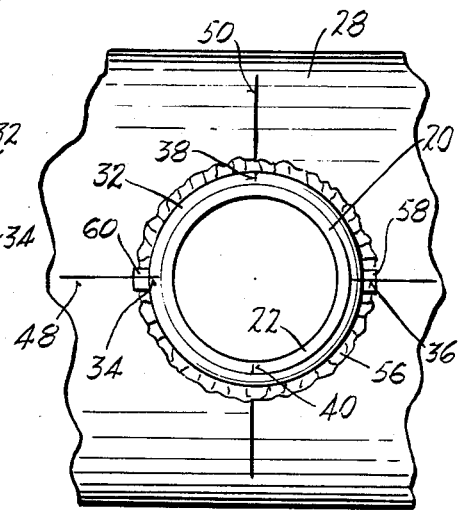
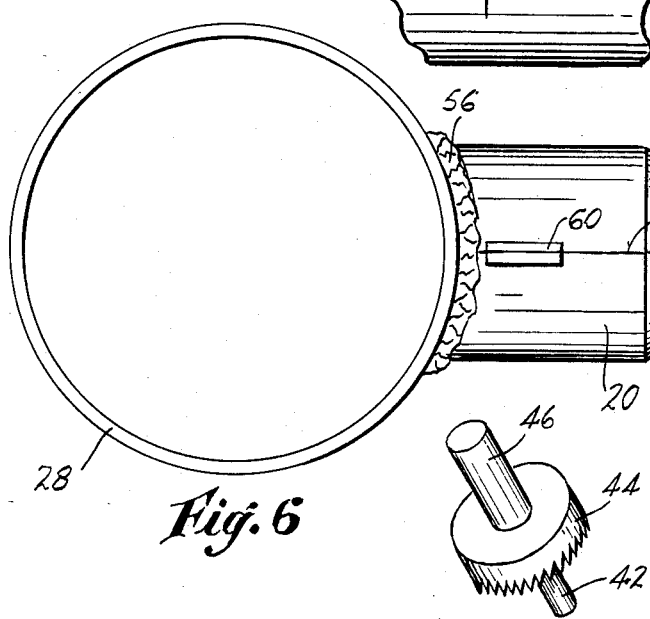

CAST METAL OUTLET FITTING

BACKGROUND

This invention relates to outlet fittings of the type intended to be attached to the side walls of a distribution pipe or the like, and more particularly to fittings adapted to be welded in place on said side walls.

Heretofore, fittings of the above type were either machined laboriously from suitable bar stock or else were forged, usually from suitable slugs or blanks. In either case a number of operations had to be performed that were of such nature as to run up the cost of the finished product to the point that prices became prohibitive. A large part of such cost was represented by labor involved with these operations, and solutions tending to reduce labor costs were found to be difficult, to say the least.

In addition the finished fittings were susceptible of being improperly installed, particularly with regard to their location on the side wall of the distribution pipe. If a workman was not sufficiently skilled in placing and welding the fitting in position, problems arose later with regard to the attaching of branch pipes, and labor costs again entered the picture, with delays due to unsatisfactory work and workmanship.

In those cases where markings were provided on the fittings to facilitate their installation, considerable accuracy was necessary to insure that the welding and attachment at a later time met with the required standards. In many instances the attachment of the fitting was done at the site of the job, under conditions that were sometimes not ideal, and improper placement could readily occur unless considerable care was exercised. The marking of fittings as heretofore provided was in general unsatisfactory due mainly to the lack of the above-mentioned accuracy. Also, scribed or otherwise impressed marks were not uniform as to their placement and permanence, being subject to the scribing process and also the skill of the worker. No standard marking was utilized, which could be relied on and at the same time be economical to provide.

SUMMARY

The above disadvantages and drawbacks of prior welded outlet fittings are obviated by the present invention, and one object of the invention is to provide an improved welded outlet fitting that is formed from a metal casting and characterized by fewer and less costly finishing operations in order to complete it.

Another object of the invention is to provide an improved welded outlet fitting as above set forth, which utilizes the parting lines inherently on the piece itself as locator or guide lines that are cooperable with the scribed crossed lines made in the wall of the distribution pipe, to accurately locate the fitting for the attachment or welding operation.

A further object of the invention is to provide an improved welded outlet fitting in accordance with the foregoing, wherein use is made of the mold parting lines in conjunction with additional locator lines to effect an accurate and fool-proof marking system on the fitting whereby even unskilled workers can readily, quickly and precisely place the fitting properly on the distribution pipe preparatory to the attachment thereto by welding.

Still another object of the invention is to provide an improved welded outlet fitting as above characterized, wherein economical, wrench-cooperable means are disposed on the exterior walls, enabling a spanner or other type of wrench to grip and hold the fitting during attachment of branch pipes, thereby to relieve any stress on the welded joint or the walls of the distribution pipe.

Another object of the invention is to provide an improved method of providing a welded outlet fitting on a distribution pipe.

Yet another object of the invention is to provide an improved welded outlet fitting as outlined above, wherein the wrench-cooperable means readily lends itself to the casting process, and wherein the marking or locator means also is especially adaptable to the casting process whereby the fabricating procedure is simplified and results in a less costly product without sacrificing quality.

An additional object of the invention is to provide an improved welded outlet fitting as above described, which is so constituted as to reduce labor costs to a minimum, and to shorten the time involved in the fabrication.

Still other objects and advantages will hereinafter appear.

In accomplishing the above objects, the invention provides a pipe fitting comprising a one-piece metal casting, preferably of iron, having a tubular configuration with means at one end for attachment to a branch pipe, such as internal or external threads or a bore to receive the pipe end with a slide fit for welding. At its other end the fitting has a fish-mouth configuration for engagement with and for welding to the side wall of a distribution pipe around an opening therein. The casting has on its exterior four axially-extending alignment marks disposed 90 degrees apart and adapted to be aligned with four cooperable, right-angled centering lines on the distribution pipe side wall. The right-angled centering lines are initially made during the installation procedure to form a cross whose center is the location for the pilot hole used by a hole saw in making the opening in the distribution pipe. By aligning the marks on the outlet fitting casting with the centering lines on the distribution pipe, an exact and precise positioning of the fitting is easily possible in the opening, in preparation for welding the fitting to the side wall of the distribution pipe. The mold parting lines which always occur on the casting, and which indicate the juncture of the two parts of the flask in which the casting is poured, are utilized as two of the alignment marks on the casting since these parting lines are always very accurately placed and not subject to operator or workman error. The two additional alignment marks are added to the casting at a later time, and can be referred to the parting lines in order to insure that they are properly placed.

Two exterior lugs are cast on the fitting, these being incorporated in the configuration of the flask. Conveniently, the parting lines of the casting bisect such lugs, although they may instead occur at locations spaced 90 degrees from the lugs, as well.

The required bores of the fitting can be provided in the casting by suitably shaping the core piece, whereby the machining necessary to produce either the external or the internal threads will be held to a minimum. Also, the fishmouth configuration at the one end of the fitting can be formed in the casting process, thereby further reducing the needed machining to effect the finished product.

By orienting the lugs for the wrench with respect to the configuration of the fishmouth end, as accomplished in the flask for the casting process, these will also have an automatic proper orientation with regard to the parting lines that appear on the casting, and thus the organization as provided by the invention eliminates many possibilities for error that are present in fittings which are machined from bar stock, or forged.

In the accompanying drawings, which illustrate several embodiments of the invention:

FIG. 1 is a top plan view of a cast metal outlet fitting as provided by the invention.

FIG. 2 is a side elevational view of the fitting of FIG. 1

FIG. 3 is also a side elevational view of the fitting, taken from a position rotated 90 degrees from that of FIG. 2.

FIG. 4 is a bottom plan view of the fitting of FIGS. 1-3.

FIG. 5 is a fragmentary side elevational view showing a portion of a distribution pipe marked with cross lines and drilled for the pilot pin of the hole saw.

FIG. 6 is an end elevational view of a distribution pipe having welded to it the cast metal fitting of the invention.

FIG. 7 is a side elevational view like that of FIG. 5 but showing the cast fitting welded to it, as depicted in FIG. 6.

FIG. 8 is a fragmentary side elevational view of a spanner-type wrench suitable for use with the fitting of the invention.

FIG. 9 is a side elevational view of a cast fitting illustrating another embodiment of the invention, wherein external screw threads are provided.

FIG. 10 is a side elevational view of still another embodiment of the invention, wherein the fitting is bored to receive a branch pipe, for welding or sweating thereto.

FIG. 11 is a side elevational view of yet another embodiment of the invention, wherein the cast fitting is externally grooved for cooperation with suitable clamping means, and FIG. 12 is a perspective view of a conventional type of hole saw, as used to make the hole in the distribution pipe.

Referring first to FIGS. 1–4, the improved cast metal outlet fitting of the invention is shown as comprising a one-piece body 20 of tubular configuration, having at one end internal threads 22 to receive the threaded end of a branch pipe (not shown). At its other end, the body 20 has a fishmouth configuration designated generally by the numeral 24, being of scalloped outline with an external bevel 26 to facilitate its welding to the side wall of a distribution pipe indicated at 28. At the fishmouth 24, the body is bored out to a larger internal diameter shown at 30, for the purpose of facilitating the welding process as is well understood in the art. An external bevel is also provided at the end of the threads 20 to eliminate a sharp corner, improving the handling and appearance of the fitting.

In the casting of the fitting, two parting lines can occur, where the joints are located in the flask or mold. Such parting lines will be 180 degrees apart, or directly opposite each other. For example, in FIGS. 1, 2 and 4 the parting lines may be those designated 34 and 36. It will be seen that these parting lines extend to the bevel 26 and in fact will appear thereon unless subsequently machined off.

By the present invention, the parting lines 34 and 36 are utilized, in conjunction with additional aligning marks 38 and 40 which can be scribed in the exterior of the body parallel to its axis and at 90 degrees removed from the parting lines 34 and 36, for the purpose of quickly and accurately locating the fitting on the distribution pipe 28 at exactly the proper location prior to the welding of the fitting to the pipe.

Referring now to FIG. 5, a section of the side wall of the distribution pipe 28 is shown, where the fitting is to be attached.

Customarily a large hole is drilled in the wall of the pipe 28 at such location, as by a hole saw of the type illustrated in FIG. 12. Saws of this type have a pilot pin, designated 42, which projects from the circular blade 44, the latter being carried by the usual shank 46.

For the purpose of properly spotting the location for the hole, it is customary to scribe a pair of cross lines, shown at 48 and 50 in FIGS. 5 and 7, in the wall of the pipe 28. Where the lines 48 and 50 intersect, a hole 52 is drilled in the pipe wall, as seen in FIG. 5 which also shows in dotted outline 54 the intended hole to be made by the saw blade 44. Proceeding from the showing of FIG. 5, the hole saw is employed to cut out the hole 54, after which the outlet fitting is welded in place around the hole 54.

In accordance with the present invention, the markings 38 an 40 and the parting lines 34 and 36 are aligned with the crossed lines 48 and 50 on the wall of the pipe 28 as the fitting is applied to the latter, and the fitting is then preliminarily tacked in place by the welder. Such alignment can be very quickly and accurately done, even by unskilled personnel, and insures that the fitting will be properly positioned over and around the hole 54.

After the fitting has been tacked in place, its alignment or position can be quickly checked by observing the positioning lines, after which the welding procedure can be completed. I have found that with such an arrangement errors are usually eliminated, and workmanship is greatly improved not only as to its quality but also regarding the time involved, and thus the cost. In FIGS. 6 and 7, the welding bead is indicated at 56.

The invention further provides an economical yet positive wrench-grip means on the exterior of the body 20 of the fitting. As seen in the figures, two lugs 58 and 60 are cast at the same time as the body 20 and are adapted for engagement by a spanner wrench, such as the wrench 62 shown in FIG. 8. The lugs 58 and 60 can be advantageously formed by shaping each mold or flask half to have half of a lug configuration. In such case, the parting lines 34 and 36 will also appear on the lugs 58 and 60, as shown. The advantage of providing the lugs 58 and 60 is that the wrench can be used to pick up some of the stress from the weld 56 and wall of the pipe 28 at the time that the branch pipe (not shown) is being threaded to the fitting. Thus, failure of the weld, or of the wall of the pipe 28 is averted.

It can be understood that a very large percentage of the overall configuration of the fitting is capable of being produced by the casting process, whereby a minimum amount of machining of the fitting is required to produce the finished product. Thus there is a great saving in cost, not only as regards equipment but also labor.

Another embodiment of the invention is illustrated in FIG. 9. This embodiment differs from the previously-described embodiment only in that external threads 66 are provided on the body 20a, in place of the internal threads 22 of the body 20.

FIG. 10 shows still another embodiment of the invention, wherein the body 20b has an enlarged bore 68 in which the end of a branch pipe (not shown) can be inserted, for securement either by sweating or welding. Otherwise, the fitting of FIG. 10 is similar to that of FIGS. 1-4.

Still another embodiment of the invention is shown in FIG. 11, wherein the body 20c has an external groove 70 adapted to accommodate a suitable clamp (not shown) by which the fitting can be attached to a branch pipe. Otherwise, the fitting in FIG. 11 is similar to that of FIGS. 1-4.

It will now be seen from the foregoing that I have provided a novel and improved cast metal outlet fitting having numerous advantages in that it is less costly, requires much less machining, and is equipped with a stress-relief for accommodating a wrench to prevent damage to the weld or the wall of the distribution pipe. Moreover, the fitting has unique alignment means cooperable with existing markings on the distribution pipe, whereby a precise and exact positioning of the fitting can be effected, even by unskilled personnel, such alignment means incorporating the parting lines of the casting in conjunction with added scribe lines or markings to obtain a desirable high accuracy, repeatedly.

Variations and modifications are possible without departing from the spirit of the claims. For example, the fitting could be made of various metals, although cast iron is at present considered preferable due to its low cost and strength, and adaptability for machining. The screw threads 22 on the interior of the casting, and the exterior screw threads 66 as well as the enlarged bore 68 and external groove 70 of the various embodiments constitute a means for attachment of a branch pipe to the fitting, and it will be understood that such means could involve a union or coupling which is threaded on the external threads 66, for the fitting of FIG. 9. No showing is made of a union or coupling, since these are items well known in the field of endeavor, and their use with the fitting of FIG. 9 would be obvious. The fitting has utility even if the lines 38 and 40 are omitted, since there is possible a two-directional positioning of the casting, using the parting lines 34 and 36. Also, if the lines 38 and 40 should be the normal parting lines of the casting, then the lugs 58 and 60 could be aligned with the single score line 48, as seen in FIG. 7, and a quick and accurate positioning could still be made by the welder.

The improved method of providing a welded outlet fitting on a distribution pipe comprises the steps of casting the fitting in metal to produce a pair of oppositely-disposed parting lines on its exterior, marking a pair of crossed locator lines on the wall of the distribution pipe where the fitting is to be attached, making a hole in the said wall of the distribution pipe centrally of said cross lines and without obliterating said cross lines completely, holding the cast fitting against said wall of the distribution pipe with its parting lines aligned with one of said crossed lines, and welding the thus-located fitting to said wall. The method further contemplates the making of the additional marking lines on the fitting, whereby the alignment of the fitting is done by matching a total of four lines. In place of the additional locator lines, the lugs 58 and 60 could be used as markers to align with one of the cross lines, and the other crossed line could be matched with the two parting lines on the fitting. An accurate locating of the fitting could be thus effected, with only one pair of locator lines on the fitting, those constituting the parting lines, which in such case would be the lines 38 and 40 located 90 degrees from the lugs 58 and 60.

I claim:

1. An outlet pipe fitting comprising a one-piece metal casting of tubular configuration, having means at one end for attachment to a branch pipe, and having a fishmouth configuration at its other end for engagement with and for welding to the side wall of a distribution pipe around an opening therein, said casting having on its exterior four axially-extending alignment marks disposed 90 degrees apart, two of which comprise parting lines that are formed during the casting process as a result of discontinuities in the inner surface of the mold, said two marks being disposed on opposite sides of the casting, said four alignment marks being adapted to be aligned with four cooperable right-angled centering lines on the distribution pipe side wall, said centering lines initially forming a cross whose center is the location for the pilot hole used by a hole saw in making the opening in the distribution pipe, said alignment effecting a centering of the casting on said opening in preparation for welding of the same to the pipe.

2. An outlet pipe fitting as set forth in claim 1, and further including:
   (a) a pair of oppositely-disposed, radially extending lugs on the outside of the casting, adapted for engagement by a spanner wrench to assume some of the stress on the fitting when a branch pipe is being attached thereto,
   (b) said lugs containing said parting lines and being integrally cast with remaining portions of the casting.

3. An outlet pipe fitting as set forth in claim 1, wherein:
   (a) said means of the casting for attachment to a branch pipe comprises internal screw threads in the bore of the casting.

4. An outlet pipe fitting as set forth in claim 1, wherein:
   (a) said means of the casting for attachment to a branch pipe comprises external screw threads cooperable with a union or coupling.

5. An outlet pipe fitting as set forth in claim 1, wherein:
   (a) said means of the casting for attachment to a branch pipe comprises an enlarged bore of the casting, adapted to receive an unthreaded end of the branch pipe.

6. An outlet pipe fitting as set forth in claim 1, wherein:
   (a) said means of the casting for attachment to a branch pipe comprises an external, annular groove adapted for cooperation with a clamping device.

7. An outlet pipe fitting as set forth in claim 1, and further including, in combination:
   (a) a distribution pipe having a hole in a side wall,
   (b) said fitting being welded to said distribution pipe over and around said hole in the side wall.

8. An outlet pipe fitting comprising a one-piece metal casting of tubular configuration, having means at one end for attachment to a branch pipe, and having a fishmouth configuration at its other end for engagement with and for welding to the side wall of a distribution pipe around an opening therein, said casting having on its exterior a pair of oppositely-disposed, radially extending lugs adapted for engagement by a spanner wrench, said lugs having parting line structures at the locations corresponding to the junction of the mold parts from which the fittings are cast, said parting line structures lying in a common median plane of the lugs and being adapted to be aligned with two opposite ones of four right-angled centering lines on the distribution pipe side wall, said centering lines initially forming a cross whose center is the location for the pilot hole used by a hole saw in making the opening in the distribution pipe, said alignment effecting a two-directional positioning of the casting on said opening in preparation for welding of the same to the pipe.

9. The invention as defined in claim 1, wherein:
(a) the four axially-extending alignment marks are all substantially parallel to one another,
(b) at least some of the marks comprise lines that extend for substantially the entire axial length of the casting.

10. The invention as defined in claim 1, wherein:
(a) the fitting has a bevelled surface at that end having the fishmouth configuration,
(b) at least some of the alignment marks extending over said bevelled surface, to provide improved visibility to the welder during welding of the fitting to the distribution pipe.

11. The invention as defined in claim 1, wherein:
(a) the fitting has a bevelled surface at said one end,
(b) at least some of the alignment marks extending over said bevelled surface, to provide improved visibility to the welder during welding of the fitting to the distribution pipe.

* * * * *